United States Patent [19]

Baldwin, IV

[11] Patent Number: 5,752,887
[45] Date of Patent: May 19, 1998

[54] GOLF AID DEVICE

[76] Inventor: Henry Clay Baldwin, IV, 50 Beaver Dam Rd., Coatesville, Pa. 19320

[21] Appl. No.: 871,837

[22] Filed: Jun. 9, 1997

[51] Int. Cl.⁶ .................................................. A63B 69/36
[52] U.S. Cl. ............................................. 473/210; 473/211
[58] Field of Search ........................................ 473/207, 208, 473/210, 211, 268, 274

[56] References Cited

U.S. PATENT DOCUMENTS

| | | |
|---|---|---|
| 1,459,705 | 6/1923 | Bullock . |
| 3,264,002 | 8/1966 | Palumbo . |
| 3,951,414 | 4/1976 | Nunez . |
| 4,251,076 | 2/1981 | Krupicka . |
| 4,531,743 | 7/1985 | Lott . |
| 4,696,111 | 9/1987 | Gardner . |
| 4,762,325 | 8/1988 | McCleery . |
| 4,789,159 | 12/1988 | Kane . |
| 4,852,882 | 8/1989 | Otsuka et al. . |
| 4,969,649 | 11/1990 | Lugiewicz . |
| 4,991,849 | 2/1991 | Fabanich . |
| 5,171,152 | 12/1992 | McCleery . |
| 5,253,870 | 10/1993 | Bedney . |
| 5,560,607 | 10/1996 | Macroglou .......................... 473/210 |

*Primary Examiner*—George J. Marlo
*Attorney, Agent, or Firm*—Morton J. Rosenberg; David I. Klein; Jun Y. Lee

[57] ABSTRACT

There is provided a golf aid device (10) for aiding a user to strike a golf ball in a predetermined manner. The device (10) generally includes a support (20) to be worn securely on the user's head; and, a self-adjusting visual guide assembly (30) coupled to the support (10). The self-adjusting visual guide assembly (30) includes an alignment portion (32) disposed in spaced relation to the support (10) for visually delineating within the user's line of sight the projected path that the golf ball is to travel upon being struck in the predetermined manner. The self-adjusting visual guide assembly (30) also includes a mechanism for pivotally coupling the alignment portion (32) to the support (10), whereby the orientation of the alignment portion (32) relative to the given playing surface in at least one plane of motion is substantially preserved independent of the user's head movement in that plane of motion.

20 Claims, 4 Drawing Sheets

GOLF AID DEVICE

BACKGROUND OF THE INVENTION

1. Field of the Invention

The subject golf aid device is generally directed to a practice or training aid to be used by a golfer. More specifically, the subject golf aid device is a device worn on the head of a user which establishes in the user's line of sight to the golf ball to be struck a visual guide for properly striking that ball. The visual guide is maintained in self-adjusting manner such that its orientation relative to the playing surface on which the ball is resting remains substantially unchanged even if the user tilts his or her head along one or more predetermined planes of motion.

Over recent years, the sport of golf has gained an unprecedented level of popularity. With the proliferation of readily accessible golf facilities and the wide public exposure received by various golf personalities, both men and women, young and old; the popularity of golf continues to grow rapidly. Consequently, there is an ever-increasing need for training and practice aids for aiding the user in perfecting his or her golf skills.

Invariably, the adequacy of a user's golfing skills comes down to the user's ability to impart a desired direction of initial travel to the ball he or she is to strike. Doing so requires the precise coordination of numerous concurrent bodily movements, though the degree of such required movements varies depending on the type of shot being made (drive, putt, and the like). While those more experienced and skilled in golf will obviously be more adept at coordinating such movements than those of lesser experience and skill, every golfer must routinely practice the movements to at least retain, if not improve, his or her skill level.

Numerous golf training and practice devices are currently available to aid users in practicing and enhancing their golf skills. Some of these devices are specifically designed to provide a visual guide that outlines for the user a direction of travel along which he or she should attempt to strike the ball. These devices, however, are very difficult to properly use, except for the most skilled of golfers.

The concurrent bodily movements that must be precisely coordinated for any proper golf swinging action include, among others: a twisting rotation of the shoulders, rotation of the chest, and a swinging of the arms. In coordinating all these movements, it is preferable that superfluous bodily movements, such as tilting of the head, be eliminated. Such superfluous bodily movements, though, are extremely difficult to restrain while concurrently generating and coordinating the rather delicate and complex set of necessary bodily movements. Those necessary bodily movements, tend, naturally, to cause a corresponding rotation and tilt of the head; and, without much practice and skill, it is quite difficult to consistently keep the head steadily stationary during the course of a swinging action.

Visual guide-establishing golf aids known in the prior art fail to make adequate provision for this type of head movement that many insufficiently experienced golfers are hampered by. Typically, those prior art devices are affixed, either to a hat or other structure worn on some part of the user's head, in such manner that the training device necessarily moves with the head. Hence, when the user moves his or her head during the course of the swinging action, the visual guide established by the training device also moves, compromising its efficacy. A need exists for a more forgiving golf training or practice aid that substantially preserves the efficacy of the visual guide it establishes, even if the user moves his or her head in a typical manner.

2. Prior Art

Golf practice and training devices which establish a visual guide for the user are known in the art. The best prior art known to Applicant includes U.S. Pat. Nos. #4,762,325; #5,253,870; #4,789,159; #3,951,414; #4,531,743; #4,696,111; #3,264,002; #4,251,076; #1,459,705; #5,171,152; #4,991,849; #4,852,882; and, #4,969,649. Such known systems, however, fail to adequately establish a guide whose orientation relative to the ball and the playing surface on which the ball rests is preserved, even where the user's head is moved during the course of the swinging action.

For instance, U.S. Pat. No. #4,762,325 is directed to a training device that mounts to the visor of a cap to be worn by the user. That device includes a pair of lateral reference elements which define a track that may be visually aligned with the desired path of the ball to be struck. The reference elements extend across a bow securely affixed to a bracket support structure which firmly grasps the cap visor. An adjustable ball and socket joint is provided between the bow and bracket structures; but, the joint necessarily provides frictional restraint to hold the reference elements immobile relative to the user's head during a swing. Consequently, the visual guide established by those reference elements moves with every slight movement of the user's head. This movement of the visual guide is intended, then, to cause enough disturbance to encourage the user to keep his or her head still during the swing.

Similarly, U.S. Pat. No. #5,253,870 is directed to a golf practicing device wherein a view bar is mounted to a headband worn by the user. The view bar is a rigid structure that is firmly attached to the headband by a tightened set screw. This rigid, fixed coupling is essential, for the device is intended specifically to provide a visual indication when the user has moved his or her head. The view bar is thus designed for the very purpose of moving with the user's head, rather than remaining stationary in spite of such head movement.

Finally, U.S. Pat. No. #3,951,414 is directed to a golf putting aid formed rather simply by a weight suspended via a flexible cord from a headband worn by the user. The headband is worn such that it extends over the user's eyes, an opening being provided in the band for only the dominant eye. During use, the weight is suspended below the eye opening such that the user may train his or her dominant eye directly over the ball by visually aligning the weight with that ball. Where the user's head is not in proper position, or if it moves away from the proper position, the weight also moves out of visual alignment with the ball to immediately indicate such improper position or movement. The suspended weight, therefore, is not at all intended to remain unaffected, either in relative position or orientation, by the user's head movements.

The need exists for a golf aid that provides a sufficient visual reference for aiding the user in the practice of his or her golfing skills which is not significantly disturbed by problematic user head movements. More specifically, the need exists for such a golf aid which is simple and may even be worn on the user's head.

SUMMARY OF THE INVENTION

It is a primary object of the present invention to provide a golf aid device which aids a user to strike a golf ball in a predetermined manner.

It is another object of the present invention to provide a golf aid device to be worn on a user's head which establishes in the user's line of sight to the golf ball to be struck a self-adjusting visual guide which the user may align with the desired direction of travel for that golf ball.

It is another object of the present invention to provide a golf aid device which establishes such a self-adjusting visual guide whose orientation relative to one or more plane of motion is substantially preserved even when the user's head is inadvertently moved in that plane of motion.

It is another object of the present invention to provide a golf aid device which may be re-configured to suit the given user.

It is another object of the present invention to provide a golf aid device that is readily collapsible.

It is yet another object of the present invention to provide a golf aid device which is simple in both structure and function.

These and other objects are attained in a golf aid device for aiding a user to strike in a predetermined manner a golf ball resting on a playing surface which comprises: a support which is adapted to be worn securely on the user's head; and, a self-adjusting visual guide assembly coupled to the support. The self-adjusting visual guide assembly includes an alignment portion extending in a longitudinal direction which is disposed in spaced relation to the support for visually delineating within the user's line of sight to the golf ball the projected path to be initially traveled by that ball when struck in the predetermined manner. The self-adjusting visual guide assembly also includes a coupling mechanism for pivotally coupling the alignment portion to the support in such manner that the orientation of the alignment portion relative to the playing surface is substantially preserved independent of the movement of the user's head relative to the playing surface along at least one plane of motion.

The support preferably includes a frame assembly having a bridge member and a pair of temple members transversely extending from opposed end portions of the bridge member. The alignment portion of the device's self-adjusting visual guide assembly preferably includes at least a pair of longitudinally extended guide members disposed in substantially parallel spaced relation one to the other. In addition, the coupling mechanism of the device's self-adjusting visual guide assembly includes a pair of substantially rigid arm members coupled between the guide members and the support. The resulting golf aid device is collapsible.

In a preferred embodiment, the guide members of the self-adjusting visual guide assembly each have a first end and a second end. One of the coupling mechanism arm members in that assembly is hingedly coupled to the first end of at least one of the guide members, while the other of the arm members is hingedly coupled to the second end of at least one of the guide members. The coupling mechanism includes at least a pair of pivot pin members which extend respectively from the arm members to be received in releasable manner in one of the frame assembly temple members. Each of the frame assembly temple members has formed therein a plurality of adjacent notches adapted to receive and releasably capture one of the pivot pin members. Hence, the guide members are coupled to the frame assembly in re-configurable manner.

DETAILED DESCRIPTION OF THE PREFERRED EMBODIMENT

Figure 1:
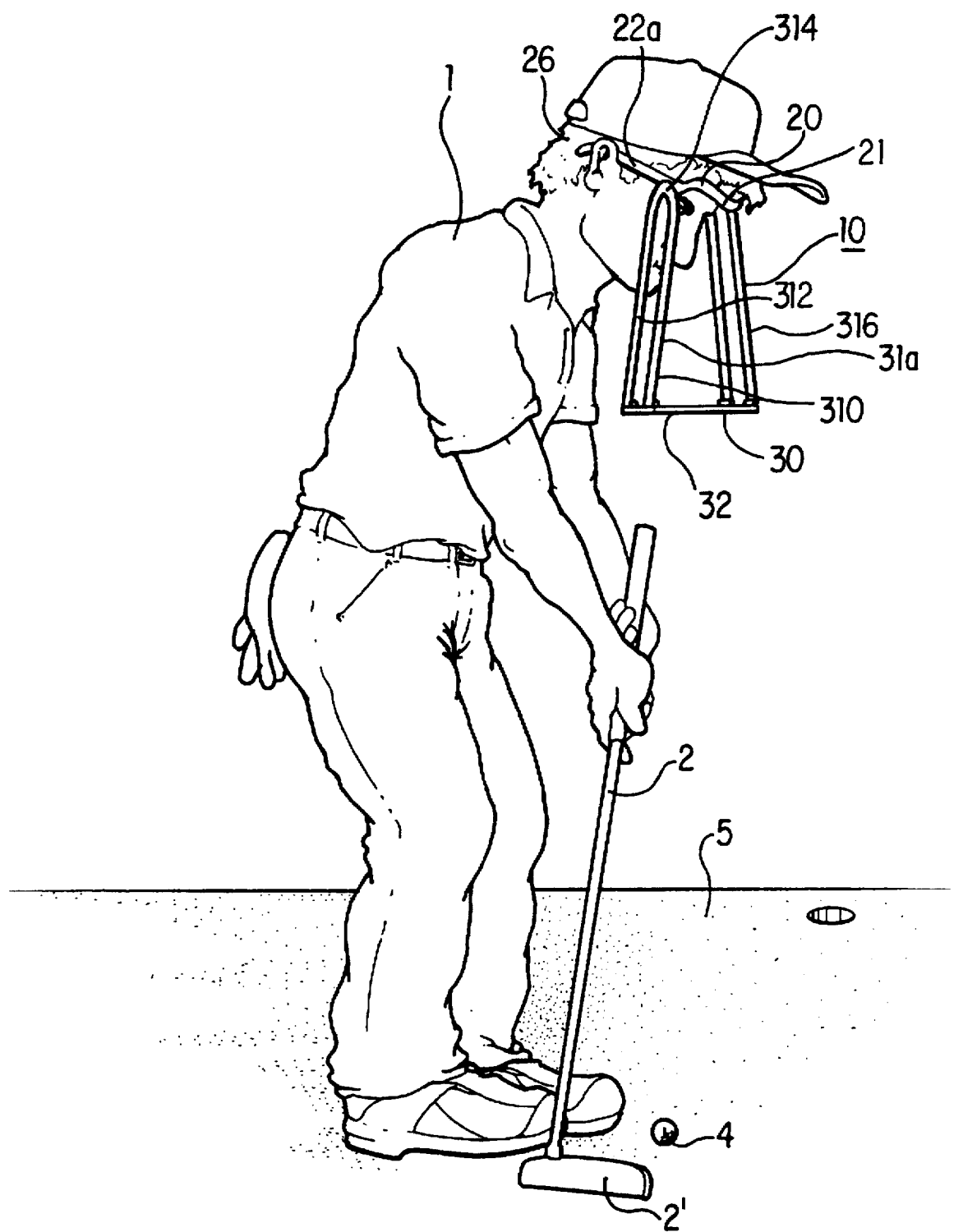
FIG. 1 is a perspective view of a preferred embodiment of a present invention shown in typical use by a user.

Turning now to FIG. 1, there is shown a preferred embodiment of a golf aid device 10 of the present invention in use by a user 1. Device 10 is worn and used by user 1 to strike a golf ball 4 resting on a playing surface 5, such as a putting green, with the head 2' of a golf club 2. The device 10 serves to establish in the user's line of sight to the ball 4 a visual guide with which he may visually align the shot he is to make.

The golf aid device 10 generally includes a support, or frame assembly, 20 to which is pivotally coupled a self-adjusting visual guide assembly 30. Frame assembly 20 is preferably similar in base structure to that of a typical pair of eyeglasses; however, it may take other forms, so long as it serves a function of a stable support securely worn on some portion of the user's head. Frame assembly 20 may, for instance, be replaced by suitably configured headband, head strap, or other head gear assemblies.

The self-adjusting visual guide assembly 30 includes an alignment portion 32 which is pivotally coupled to and suspended from frame assembly 20 by a coupling mechanism. The coupling mechanism preferably includes a pair of arm members 31a, 31b, each of which is integrally formed from a suitably lightweight material known in the art of suitable rigidity and strength, such as plastic, fiberglass, or the like. Each arm member 31a, 31b is formed with a pair of finger-like bars 310, 312 which are joined at and extend from a wishbone section 314. The terminal end of each bar 310, 312 is joined by a hinged coupling to be discussed in following paragraphs to alignment portion 32 so as to enable the collapsing of the resultant guide assembly 30.

It is not essential to the invention that arm members 31a, 31b be formed with the structural configuration disclosed. It may, for instance, be formed integrally as a unitary member of solid material. The elimination of extraneous material between bars 310, 312, however, minimizes the weight of each arm 31a, 31b so as to minimize the load to be borne by user 1 in using device 10. Even a slight decrease in overall weight of device 10 tends to result in substantial reduction in the level of physical exertion required of the user, particularly since user 1 is often likely to make use of device 10 for extended periods during a typical golf outing.

Figure 2:
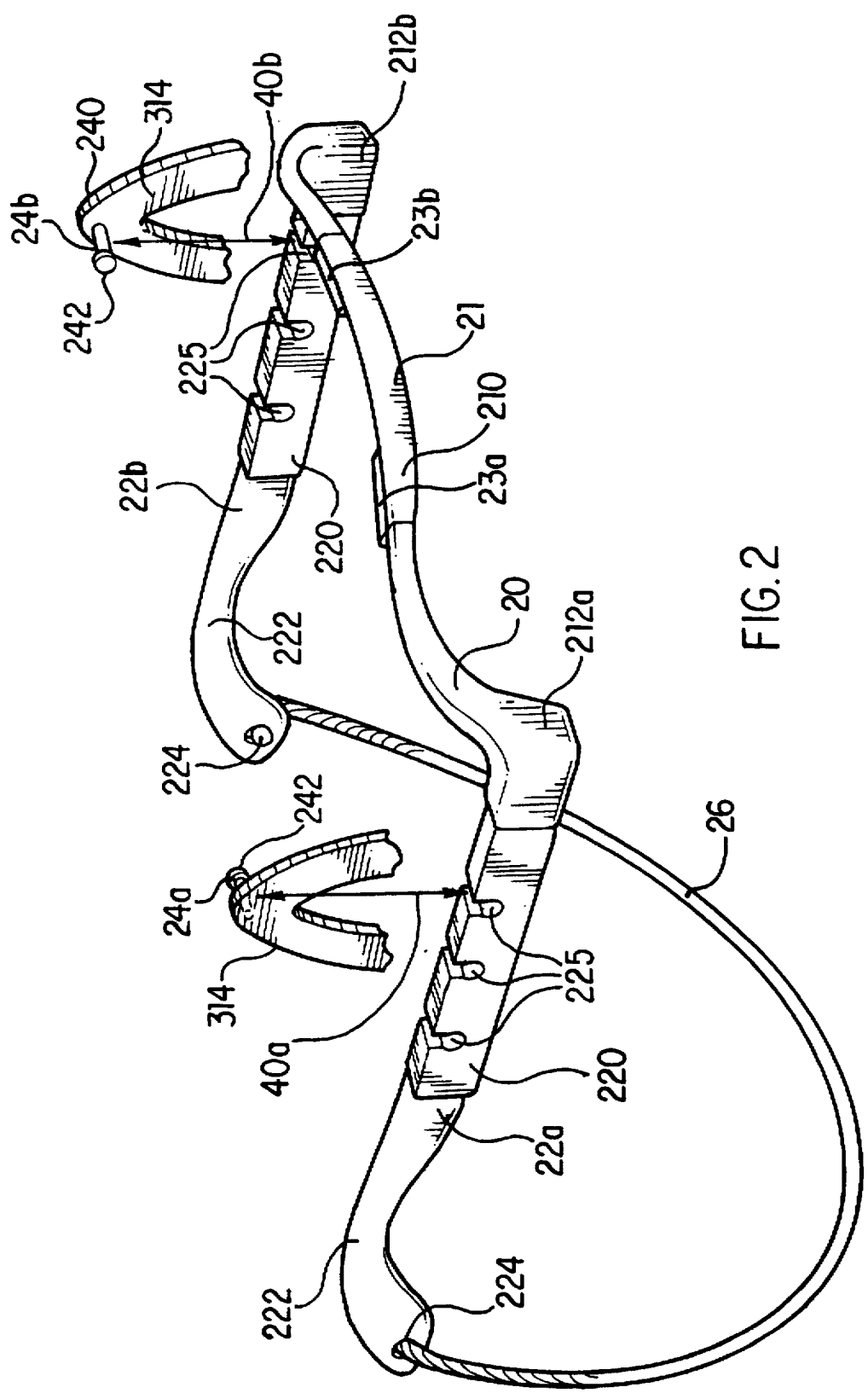
FIG. 2 is an exploded perspective view, partially cut-away, of the coupling mechanism in a preferred embodiment of the present invention.

Referring to FIG. 2, frame assembly 20 includes a bridge portion 21 having opposed lateral end portions at which a pair of temple members 22a, 22b are pivotally joined by a hinged coupling to extend substantially transversely therefrom when device 10 is in use. Temple members 22a, 22b are each formed with a coupling section 220 and a terminal, ear-engaging section 222. Temple members 22a, 22b are of suitable dimension, rigidity, and strength to firmly engage the user's ears when frame assembly 20 is worn by user 1. To reinforce this engagement and thereby insure that frame assembly 20 remain in position on the user's head, a reinforcement strap or wire 26 is provided with its two ends being attached respectively to terminal sections 222 via attachment openings 224 formed in those sections.

Bridge member 21 of frame assembly 20 is configured as shown with an intermediate section 210 extending laterally between a pair of block sections 212a, 212b. Any suitable hinged coupling mechanisms known in the art may be employed at each block section 212a, 212b to join temple members 22a, 22b respectively thereat. Intermediate section 210 is adapted to bear against the user's forehead for stabilization purposes. So that potential discomfort for user 1 may be alleviated, a pair of resilient pads 23a, 23b are preferably fastened to the side of intermediate section 210 which would bear against the user's head.

Any material known in the art for use in forming eyeglass frames and the like may be employed in forming bridge member 21 and temple members 22a, 22b. The particular choice of material is not important to the present invention. It is only important in that regard that the material be of sufficient strength and rigidity, yet be of sufficiently light weight to serve the functions disclosed herein without causing substantial discomfort to user 1.

Coupling section 220 of each temple member 22a, 22b has formed therein a plurality of coupling notches 225 which are configured, preferably, to receive in snap-fit manner a cylindrical coupling pin. Each notch 225 is suitably configured such that once a given cylindrical pivot pin of suitable dimension is snap-fit therein, the pin is not obstructed from rotating axially, though it may be captured from escape out of the snap-fit engagement.

Formed adjacent the apex of the wishbone section 314 for each arm member 310, 312 is a pivot pin member 24a, 24b. Each pivot pin member 24a, 24b is characterized by a cylindrical shaft section 240 that extends transversely inward from the given wishbone section 314, to a terminal head section 242. Shaft section 240 of each pivot pin member 24a, 24b may be forcefully inserted or removed from a press-fit engagement with one of the notches 225 by manipulating the given wishbone section 314 and pivot pin member 24a, 24b in the direction indicated by arrows 40a, 40b. When each pivot pin member 24a, 24b is in press-fit engagement with one of the notches 225, its head section 242 prevents it from sliding along its axial direction out of this engagement. The structural configuration of the given notch 225, itself, which effects the press-fit engagement prevents the unintended escape of the pivot pin member 24a, 24b through the upper opening of that notch 225.

Preferably, shaft section 240 of each pivot pin member 24a, 24b is of sufficient diametric dimension relative to that of the given notch 225 such that it may freely rotate about its axis while in press-fit engagement therewith. Device 10 may be re-configured to better fit a given user 1 simply by engaging pivot pin members 24a, 24b with notches 225, 225 at different locations along coupling sections 220, 220 of temple members 22a, 22b.

Figure 4:
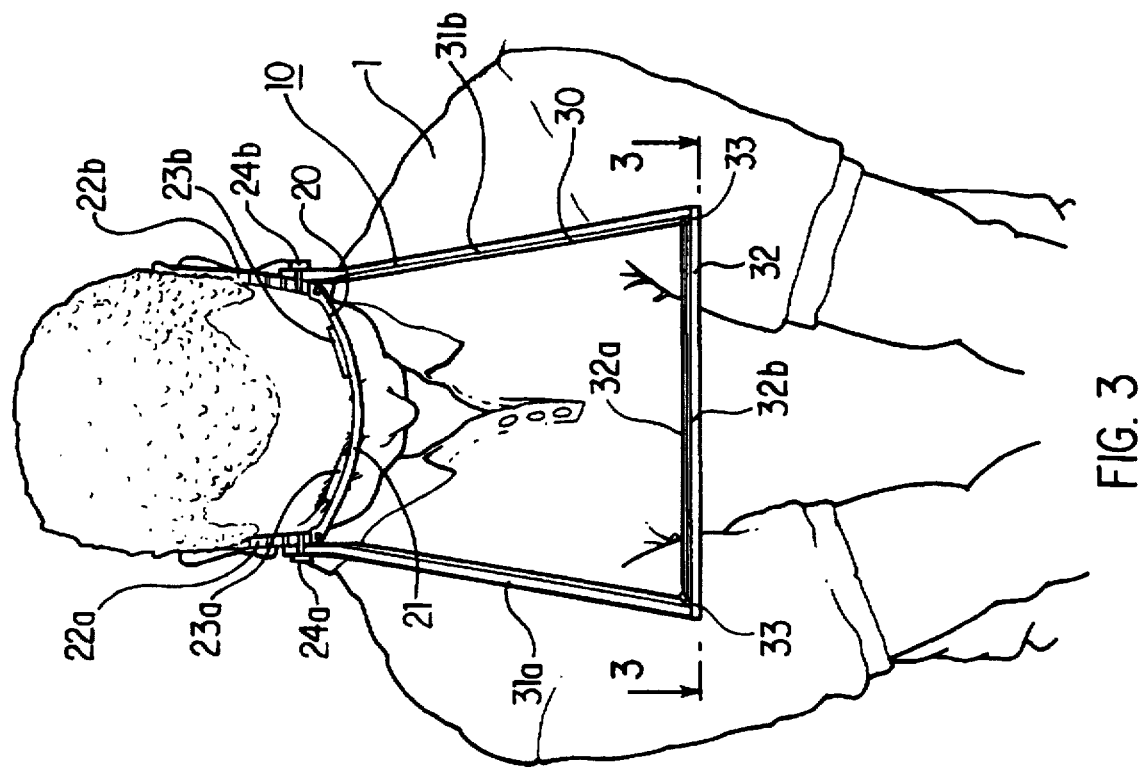
FIG. 4 is a schematic diagram of the visual guide established by a preferred embodiment of the present invention illustrating the guide as viewed from the perspective of the user; and, FIG. 5 is a perspective view of a preferred embodiment of the present invention in its collapsed configuration.
Figure 3:
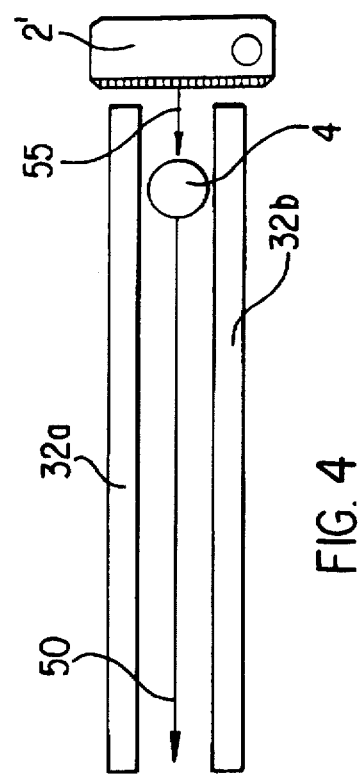
FIG. 3 is an elevational view of a preferred embodiment of the present invention shown in typical user by a user.

Turning now to FIGS. 3–4, there are shown elevational and plan views of alignment portion 32 of the self-adjusting visual guide assembly 30. Alignment portion 32 is formed preferably by a pair of laterally extended guide members 32a, 32b, each of which is joined at its ends to the lower terminal ends of arm members 31a, 31b by a hinged coupling 33. Preferably, each guide member 32a, 32b extends between fingers 310, 310 and 312, 312 of the opposed arm members 31a, 31b.

Hinged coupling 33 may be of any suitable type known in the art. The coupling functions primarily to enable arm members 31a, 31b to be collapsed substantially over guide members 32a, 32b when device 10 is not in use, and is not essential to the present invention.

During use of the resulting structure, guide members 32a, 32b are pivotally suspended from the frame assembly 20 to substantially freely move towards and away from the torso of user 1. As shown in the illustrative view in FIG. 4 taken from the user's perspective, user 1 visually positions members 32a, 32b about the golf ball 4 to align them with the ball's desired path of travel indicated by directional arrow 50. Using guide members 32a, 32b as a visual reference, user 1 may then accurately align the direction of swing for golf club head 2' indicated by arrow 55 in a manner that will cause the ball 4 to follow the desired ball travel path 50.

Note that if user 1 tilts his head about a tilt axis having a component parallel to the desired direction of travel 50 for ball 4, a misalignment of guide members 32a, 32b tends to result. The pivotal coupling of those guide members 32a, 32b to frame assembly 20, however, substantially decouples the movement of guide members 32a, 32b from the user's head movements about the tilt axis. That is, even if user 1 tilts his head forwards or backwards (along a plane of motion substantially normal to the direction 50), guide members 32a, 32b tend, by force of gravity, to remain stationary. The orientation of the visual guide established by those guide members 32a, 32b relative to the ball 4 and the playing surface 5 on which it rests, therefore, is preserved though the user may tilt his head in what may otherwise be a direction quite disruptive to the established visual guide.

The plane of motion for the user's head which is thus compensated for by pivotally suspending guide members 32a, 32b from frame assembly 20 may, in other embodiments, be varied simply by varying the position and orientation of the axis about which those guide members 32a, 32b are pivotally suspended. Furthermore, multi-dimensional forms of such compensation may be simply realized in other alternate embodiments of the present invention by incorporating a more elaborate coupling mechanism through which pivotal displacement of the suspended guide members 32a, 32b about more than one pivotal axis is available.

Guide members 32a, 32b are preferably formed of a substantially rigid, opaque material; however, they may alternatively be formed of translucent material if so desired by the user. Similarly, while guide members 32a, 32b are preferably configured as substantially straight, parallel bars, they may be configured with other geometric shapes and different relative arrangements to suit the needs and preferences of a given user 1.

Figure 5:
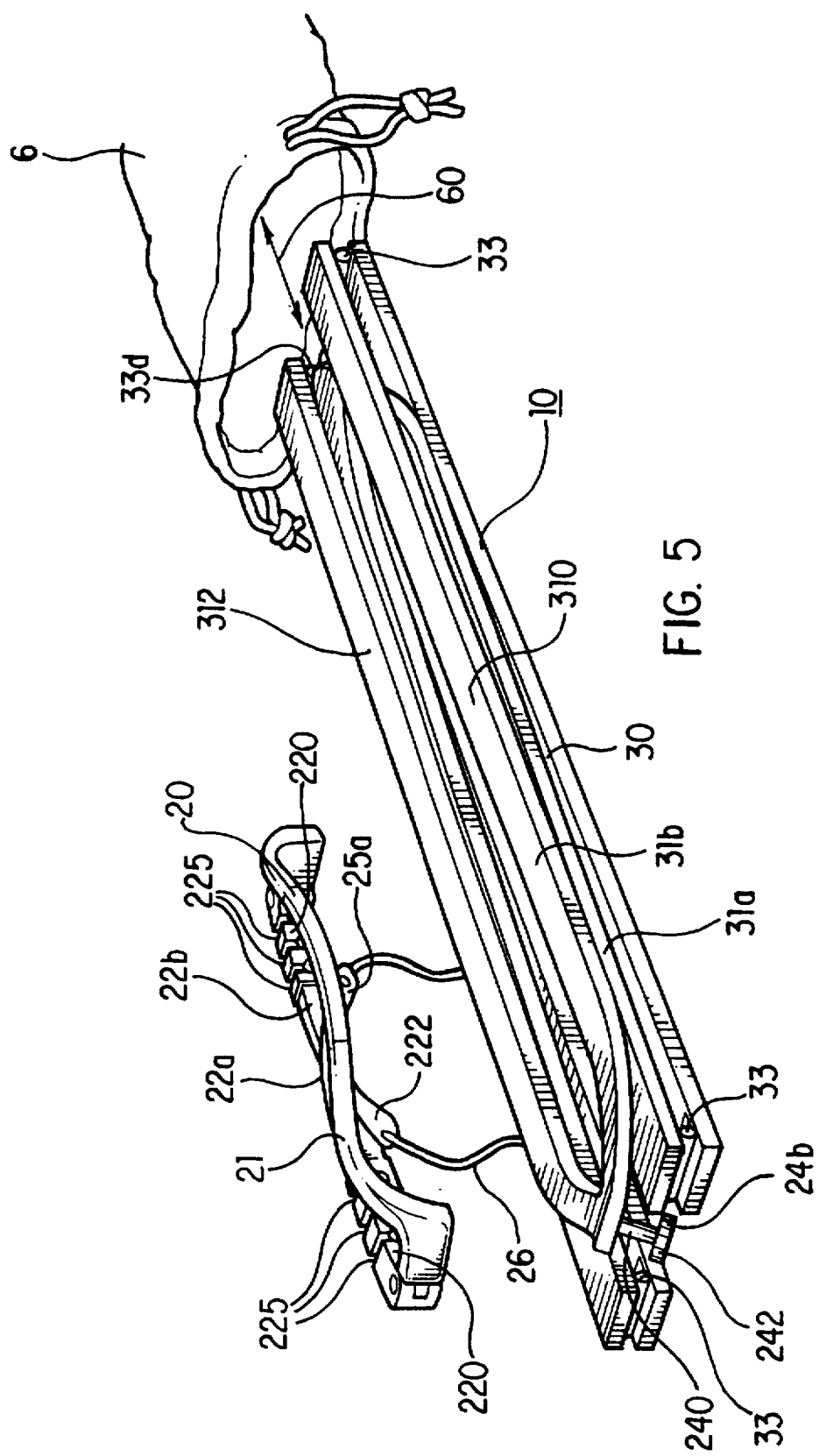

Turning now to FIG. 5, golf aid device 10 is shown in its disassembled, collapsed configuration for storage. The self-adjusting visual guide assembly 30 may simply be disengaged from the frame assembly 20 by forcefully withdrawing each pivot pin member 24a, 24b from its press-fit engagement with a notch 225 of a temple member 22a, 22b. Frame member 20 and visual guide assembly 30 may then each be collapsed about its hinged coupling points as shown. Each collapsed assembly may then be placed within a pouch 6 or other carrying container, as shown by the directional arrows 60, until user 1 again wishes to make use of the device.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular numbers and combinations of the elements disclosed may be incorporated, all without departing from the spirit or scope of the invention as defined in the appended Claims.

What is claimed is:

1. A golf training aid device for aiding a user to strike in a predetermined manner a golf ball resting on a playing surface comprising:
   (a) support means adapted to be worn securely on the user's head; and,
   (b) a self-adjusting visual guide assembly coupled to said support means, said self-adjusting visual guide assembly including:
      (1) an alignment portion extending in a longitudinal direction, said alignment portion being disposed in spaced relation to said support means for visually delineating within the user's line of sight the projected path to be initially travelled by said golf ball upon being struck in said predetermined manner; and,
      (2) coupling means for pivotally coupling said alignment portion to said support means, whereby the orientation of said alignment portion relative to said playing surface is substantially preserved independent of the movement in at least one plane of motion of the user's head relative to said playing surface.

2. The golf training device as recited in claim 1 wherein said support means includes a frame assembly having a bridge member and a pair of temple members transversely extending from opposed end portions thereof.

3. The golf training aid device as recited in claim 2 wherein said coupling means includes at least a pair of pivot pin members extending respectively from said arm members, each said pivot pin member being received in releasable manner in one of said temple members of said frame assembly.

4. The golf training aid device as recited in claim 3 wherein each of said temple members has formed therein a plurality of adjacent notches adapted to receive and releasably capture one of said pin members.

5. The golf training aid device as recited in claim 1 wherein said alignment portion includes at least a pair of longitudinally extended guide members disposed in substantially parallel spaced relation one to the other, each of said guide members having longitudinally opposed first and second ends.

6. The golf training aid device as recited in claim 5 wherein said coupling means includes a pair of substantially rigid arm members coupled between said guide members and said support means.

7. The golf training aid device as recited in claim 6 wherein said self-adjusting visual guide assembly is collapsible.

8. The golf training aid device as recited in claim 7 wherein one of said arm members is hingedly coupled to said first end of at least one of said guide members and the other of said arm members is hingedly coupled to said second end of at least one of said guide members.

9. A golf training aid device for aiding a user to strike in a predetermined manner a golf ball resting on a playing surface comprising:
   (a) a frame assembly adapted to be worn securely on the user's head; and,
   (b) a collapsible self-adjusting visual guide assembly coupled to said frame assembly, said self-adjusting visual guide assembly including:
      (1) an alignment portion extending in a longitudinal direction, said alignment portion being disposed in spaced relation to said frame assembly for visually delineating within the user's line of sight the projected path to be initially travelled by said golf ball upon being struck in said predetermined manner; and,
      (2) at least a pair of substantially rigid arm members for pivotally coupling said alignment portion to said frame assembly, whereby the orientation of said alignment portion relative to said playing surface is substantially preserved independent of the movement in at least one plane of motion of the user's head relative to said playing surface.

10. The golf training aid device as recited in claim 9 wherein said frame assembly includes a bridge member and a pair of temple members transversely extending from opposed end portions thereof.

11. The golf training aid device as recited in claim 10 wherein said alignment portion includes at least a pair of longitudinally extended guide members disposed in substantially parallel spaced relation one to the other, each of said guide members having longitudinally opposed first and second ends.

12. The golf training aid device as recited in claim 11 wherein one of said arm members is hingedly coupled to said first end of at least one of said guide members and the other of said arm members is hingedly coupled to said second end of at least one of said guide members.

13. The golf training aid device as recited in claim 12 wherein said coupling means includes at least a pair of pivot pin members extending respectively from said arm members, each said pivot pin member being releasably received in one of said temple members of said frame assembly.

14. The golf training aid device as recited in claim 13 wherein each of said temple members has formed therein a plurality of adjacent notches adapted to receive and releasably capture one of said pin members.

15. A golf training aid device for aiding a user to strike in a predetermined manner a golf ball resting on a playing surface comprising:
   (a) a frame assembly adapted to be worn securely on the user's head; and,
   (b) a self-adjusting visual guide assembly pivotally coupled to said frame assembly to be suspended therefrom, said self-adjusting visual guide assembly including an alignment portion extending in a longitudinal direction, said alignment portion being disposed in spaced relation to said frame assembly for visually delineating within the user's line of sight the projected path to be initially travelled by said golf ball upon being struck in said predetermined manner, whereby said self-adjusting visual guide assembly is adapted to remain substantially freely displaceable relative to said frame member in at least one plane of motion.

16. The golf training aid device as recited in claim 15 wherein said frame assembly includes a bridge member and a pair of temple members transversely extending from opposed end portions thereof.

17. The golf training aid device as recited in claim 16 wherein said alignment portion includes at least a pair of longitudinally extended guide members disposed in substantially parallel spaced relation one to the other, each of said guide members having longitudinally opposed first and second ends.

18. The golf training aid device as recited in claim 17 wherein said self-adjusting visual guide assembly includes a pair of substantially rigid arm members coupled between said guide members and said frame assembly.

19. The golf training aid device as recited in claim 18 wherein said self-adjusting visual guide assembly includes at least a pair of pivot pin members extending respectively from said arm members, each said pivot pin member being received in releasable manner in one of said temple members of said frame assembly.

20. The golf training aid device as recited in claim 19 wherein each of said temple members has formed therein a plurality of adjacent notches adapted to receive one of said pin members in pressure fit manner.

* * * * *